(12) United States Patent
Van Der Gaag et al.

(10) Patent No.: US 12,336,465 B2
(45) Date of Patent: Jun. 24, 2025

(54) DRIVE DEVICE FOR VERTICAL ELONGATE UNITS SUSPENDED FROM A GUIDE RAIL, SUCH AS GROWING UNITS FOR PLANTS

(71) Applicants: Urban Agrotech B.V., Pijnacker (NL); C.C. van der Gaag Holding B.V., Delft (NL)

(72) Inventors: Vincent Van Der Gaag, Pijnacker (NL); Chris Van Der Gaag, Delft (NL)

(73) Assignees: URBAN ARGOTECH B.V. (NL); C.C. VAN DER GAAG HOLDING B.V. (NL)

( * ) Notice: Subject to any disclaimer, the term of this patent is extended or adjusted under 35 U.S.C. 154(b) by 292 days.

(21) Appl. No.: 18/026,919
(22) PCT Filed: Sep. 17, 2021
(86) PCT No.: PCT/NL2021/050563
§ 371 (c)(1),
(2) Date: Mar. 17, 2023
(87) PCT Pub. No.: WO2022/060226
PCT Pub. Date: Mar. 24, 2022

(65) Prior Publication Data
US 2023/0320281 A1 Oct. 12, 2023

(30) Foreign Application Priority Data
Sep. 17, 2020 (NL) .................................. 1043789

(51) Int. Cl.
A01G 31/04 (2006.01)
A01G 9/02 (2018.01)
(Continued)

(52) U.S. Cl.
CPC ........... *A01G 9/022* (2013.01); *B65G 17/485* (2013.01); *B65G 17/20* (2013.01); *B65G 47/61* (2013.01)

(58) Field of Classification Search
CPC ...... B65G 17/485; A01G 9/022; A01G 31/04; A01G 31/042
(Continued)

(56) References Cited

U.S. PATENT DOCUMENTS 8,925,709 B2 * 1/2015 Studer .................. B65G 65/00
414/277
9,205,992 B2 12/2015 Otto
(Continued)

FOREIGN PATENT DOCUMENTS

CH 713399 A1 7/2018
EP 3524545 A1 8/2019
(Continued)

OTHER PUBLICATIONS

International Search Report (ISR) for PCT/NL2021/050563 mailed Jan. 5, 2022 (5 pages).
(Continued)

*Primary Examiner* — Douglas A Hess
(74) *Attorney, Agent, or Firm* — Shumaker, Loop & Kendrick, LLP; Patrick B. Horne

(57) ABSTRACT

Device for driving vertical units which are suspended from a guide rail for growing plants, wherein each unit comprises a first engagement element. Drive means cause the displacement members, each of which comprise a row of second engagement elements, to alternatively perform a first, outward movement and a second, inward movement. The first and second engagement elements are configured such that they engage with each other in such a way during this first movement that the units are displaced and are not displaced during the second movement. The second engagement elements are provided across the entire operating area of the one or more displacement members in such a way that the mutual distance increases. In this way, the units are guided through a growing space, with the mutual distance automatically being increased in order to give the plants more space as the growing process progresses.

5 Claims, 3 Drawing Sheets

(51) Int. Cl.
  *B65G 17/48* (2006.01)
  *B65G 17/20* (2006.01)
  *B65G 47/61* (2006.01)

(58) Field of Classification Search
  USPC ........................................................ 198/687
  See application file for complete search history.

(56) References Cited

U.S. PATENT DOCUMENTS

| | | |
|---|---|---|
| 10,136,587 B1 | 11/2018 | Johnson et al. |
| 10,913,610 B2 * | 2/2021 | Andreae ................ B65G 21/20 |
| 11,565,886 B2 * | 1/2023 | Liu ........................ B65G 43/06 |
| 11,612,112 B2 * | 3/2023 | Coffin .................. A01G 27/005 47/65 |
| 11,778,955 B2 * | 10/2023 | Spiro .................. A01G 27/005 47/62 A |
| 11,832,569 B2 * | 12/2023 | Coffin .................... A01D 46/30 |
| 11,856,902 B2 * | 1/2024 | Coffin .................. A01G 31/045 |
| 11,877,548 B2 * | 1/2024 | Deschambault ..... A01G 31/045 |
| 11,944,049 B2 * | 4/2024 | Coffin .................. A01G 31/045 |
| 12,089,545 B1 * | 9/2024 | Kalayjian ............ A01G 31/045 |
| 2006/0162252 A1 | 7/2006 | Lim |

FOREIGN PATENT DOCUMENTS

WO   WO-2004047521 A1 *   6/2004   ........... A01G 31/045
WO       2010097562 A1     9/2010

OTHER PUBLICATIONS

Written Opinion (WO) for PCT/NL2021/050563 mailed Jan. 5, 2022 (6 pages).

* cited by examiner

DRIVE DEVICE FOR VERTICAL ELONGATE UNITS SUSPENDED FROM A GUIDE RAIL, SUCH AS GROWING UNITS FOR PLANTS

TITLE: DRIVE DEVICE FOR VERTICAL ELONGATE UNITS SUSPENDED FROM A GUIDE RAIL, SUCH AS GROWING UNITS FOR PLANTS

TECHNICAL FIELD AND BACKGROUND

The invention relates to a device for driving a number of vertical elongate units which are suspended from a guide rail so as to be displaceable, in particular growing units which are configured for growing plants.

The present invention aims to provide a system comprising a guide rail from which (growing) units are suspended in juxtaposition, which units are thus displaced in a growing space, for example a growing container, during growing of the plants. The plants which are to be raised or matured and protrude from the (hanging) units on the (vertical) side, are entered into the system on one side in the form of small plants, pass through the entire growing space, during which process the plants obviously increase in size, and are removed at the end of the system as relatively large plants. Preferably, a guide rail is used which ends up (for removal of the plants) at approximately the same location as the one where the small plants or seedlings are introduced into the system.

The present invention aims in particular to provide a system in which the mutual distance between the hanging growing units is automatically increased over the course of the process in order to (after all plants become greater) provide ever more space as the growing process proceeds. Thus, the invention aims to provide that the units are suspended close together at the start of the process and thus do not take up more space than required, while the mutual (growing) space is increased as the plants require more (lateral) space.

To this end, the present invention provides a device for driving a number of vertical elongate units which are suspended from a guide rail so as to be displaceable, in particular growing units which are configured for growing plants, wherein each unit comprises a first engagement element;

wherein the device furthermore comprises one or more drive means which alternately perform a first, outward movement and a second, inward movement, in particular one or more drive cylinders, which one or more drive means are connected to one or more cooperating displacement members, each of which comprises a row of second engagement elements, wherein the first engagement elements and the second engagement elements are configured such that they, on the one hand, engage with each other in such a way when the drive means perform the first movement that the units whose first engagement element is situated in the vicinity, that is to say within the effective range of the movement, of one of the second engagement elements, is displaced along the guide rail by this second engagement element of the respective displacement member, while these first and second engagement elements, on the other hand, when the drive means perform the second movement, either do not engage with each other or engage with each other in such a way that the units whose first engagement element is situated in the vicinity, that is to say within the effective range of the movement, of one of the second engagement elements, is not displaced along the guide rail by that second engagement element of the respective displacement member.

In order to provide sufficient growing space for the plants, which growing space increases during the process, the mutual distance between the second engagement elements, calculated across the entire operating area of the one or more cooperating displacement members, preferably differs. The second engagement elements are then preferably provided across the entire operating area of the one or more displacement members in such a way that, in the direction in which the units are displaced along the guide rail, the mutual distance, on average, increases continuously or discontinuously.

SUMMARY

According to a preferred embodiment of the invention, the first engagement elements comprises a pawl which is rotatable or otherwise movable and which is configured in such a way that the respective unit is only displaced during the first movement.

In an alternative embodiment of the invention, the second engagement elements comprises a pawl which is rotatable or otherwise movable and which is configured in such a way that the respective unit is only displaced during the first movement.

BRIEF DESCRIPTION OF THE DRAWINGS

The invention will now be discussed in more detail by means of the following description of the figures.

FIGS. 1-3 show an exemplary embodiment of a device 1 according to the invention, intended and configured to drive a number of displaceable vertical elongate units 3 suspended from a guide rail 2, in particular growing units which are configured to grow plants, in which every unit 3 comprises a first engagement element 4.

Figure 1:
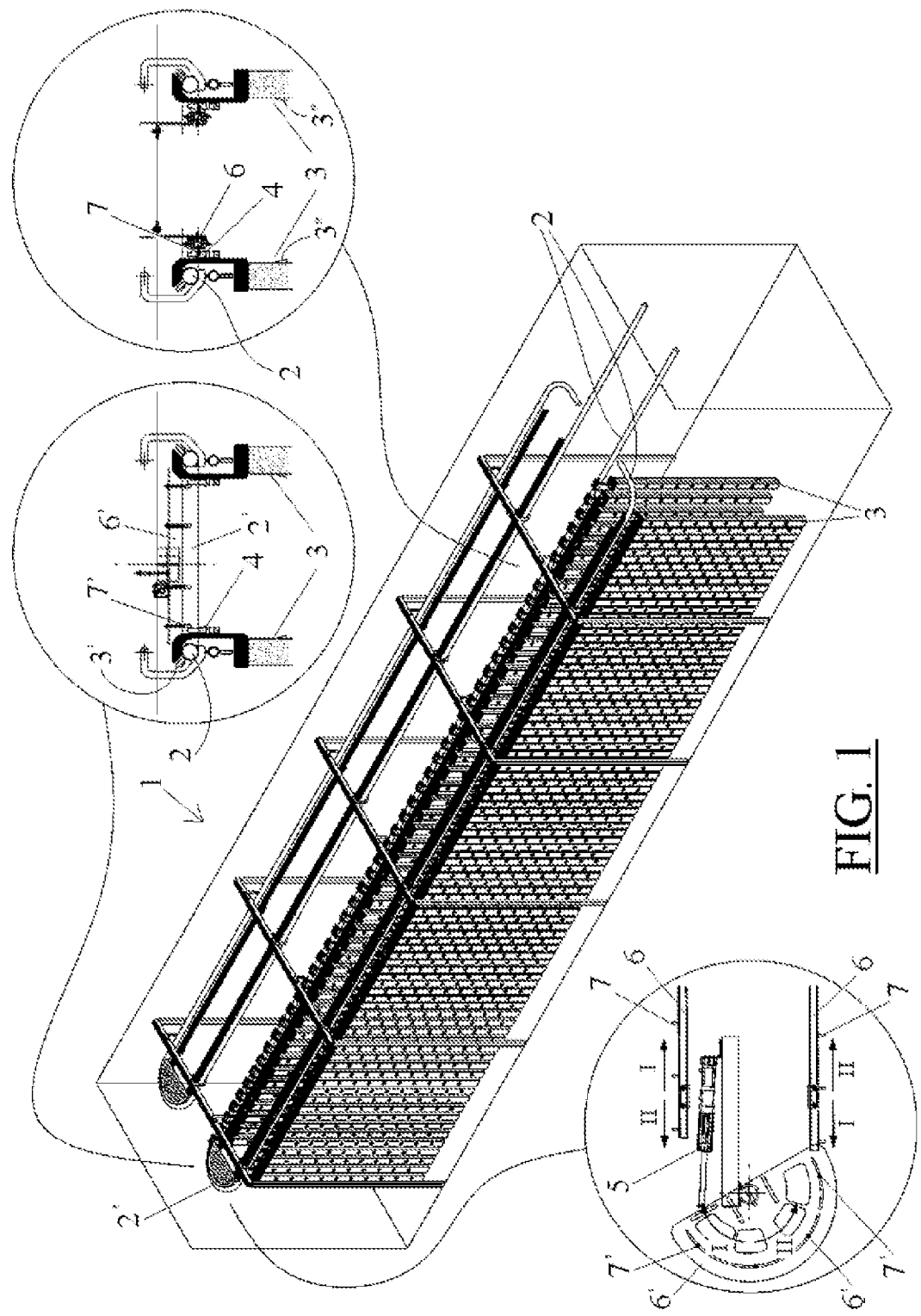
FIG. 1 shows an exemplary embodiment of a device according to the invention.

The device furthermore comprises drive means which alternately perform a first, outward movement I and a second, inward movement II, in particular drive cylinders 5, which drive means are connected to cooperating displacement members 6, each of which comprise a row of (fixed) second engagement elements 7.

The first engagement elements 4 (of the units 3) and the second engagement elements 7 (of the displacement members 6) are configured such that these, on the one hand, engage with each other in such a way when the drive means perform the first movement I, that the units 3 whose first engagement element 4 is situated in the vicinity, that is to say within the effective range of the movement, of one of the second engagement elements 7, is displaced along/over the guide rail 2 by that second engagement element 7 of the respective displacement member 6. While on the other hand these first and second engagement elements, when the drive means perform the second movement II, either do not engage with each other or "engage" with each other in such a way that the units 3 whose first engagement element 4 is situated in the vicinity, that is to say within the effective range of the movement, of one of the second engagement elements, is not displaced by that second engagement element 7 of the respective displacement member 6 along the guide rail. This results in the units 3 only actively/effectively being engaged and driven during the first movement I, (the "drive stroke"), while the units 3 remain in place during the second movement II (the "return stroke").

The mutual distance d1, d2, d3, d4 etc., respectively, between the second engagement elements differs across the entire operating area of the cooperating displacement members. The reason for this is that, in the illustrated exemplary embodiment, the second engagement elements 7 are fitted in such a way across the entire operating area of all displacement members 6 that the mutual distance d1, d2, d3, d4 etc., respectively, on average increases (continuously or discontinuously) in the direction (I) in which the units 3 are displaced along the guide rail 2.

Figure 2:
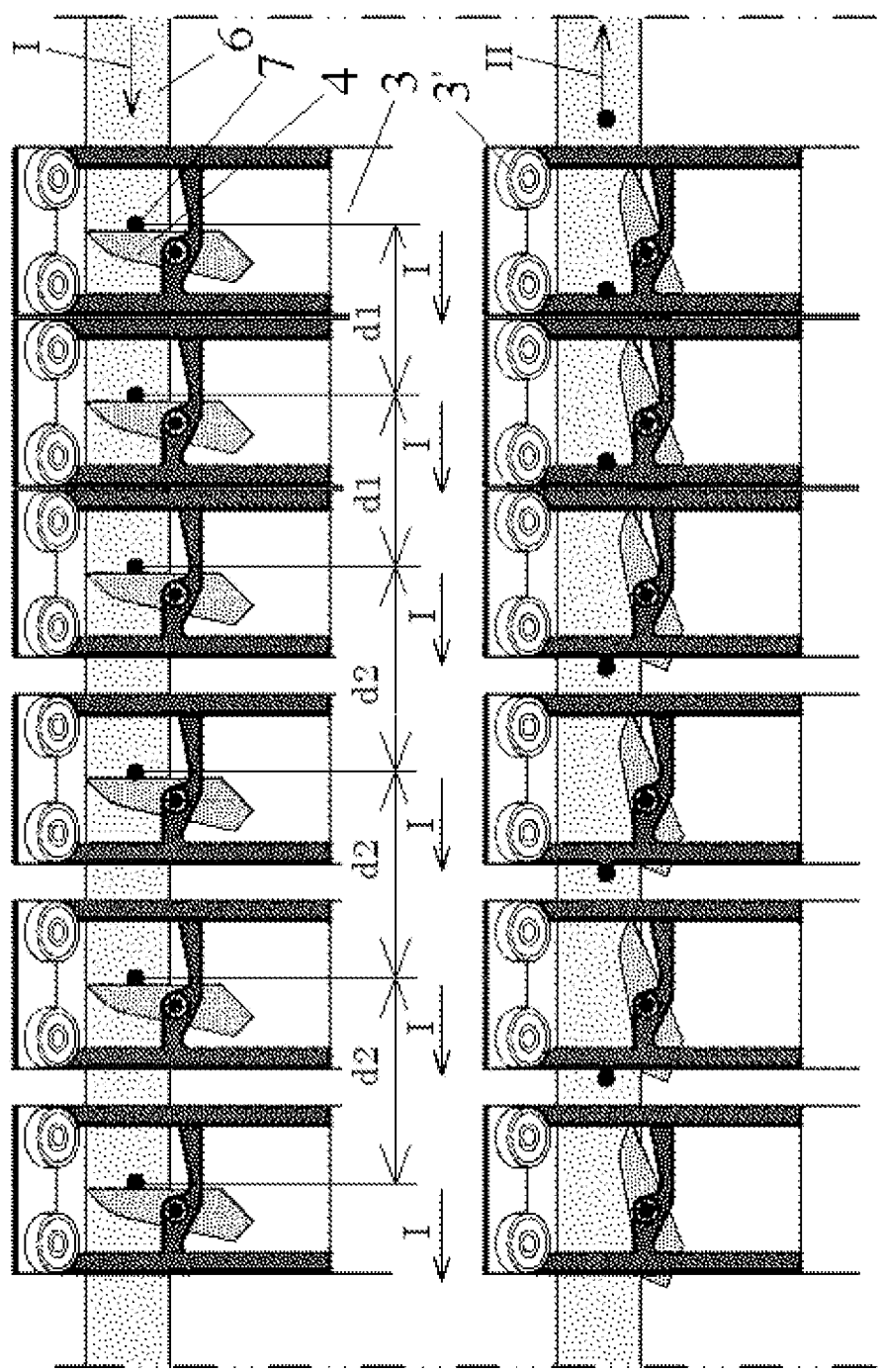
FIG. 2 illustrates the stepwise displacement of the (growing) units.

FIG. 2 in particular shows that the first engagement elements 4 in the illustrated embodiment comprise a rotatable pawl which is configured in such a way that the units 3 are only displaced during the first movement I, while the units 3 remain in place during the second movement II (the "return stroke").

It would also have been possible to design the second engagement elements 7 as rotatable or otherwise movable pawls and the first engagement elements 4 as fixed pawls; with such an alternative embodiment, it would also have been possible for the units 3 to be displaced only during the first movement I of the displacement members 7 and not during the second movement II.

Figure 3:
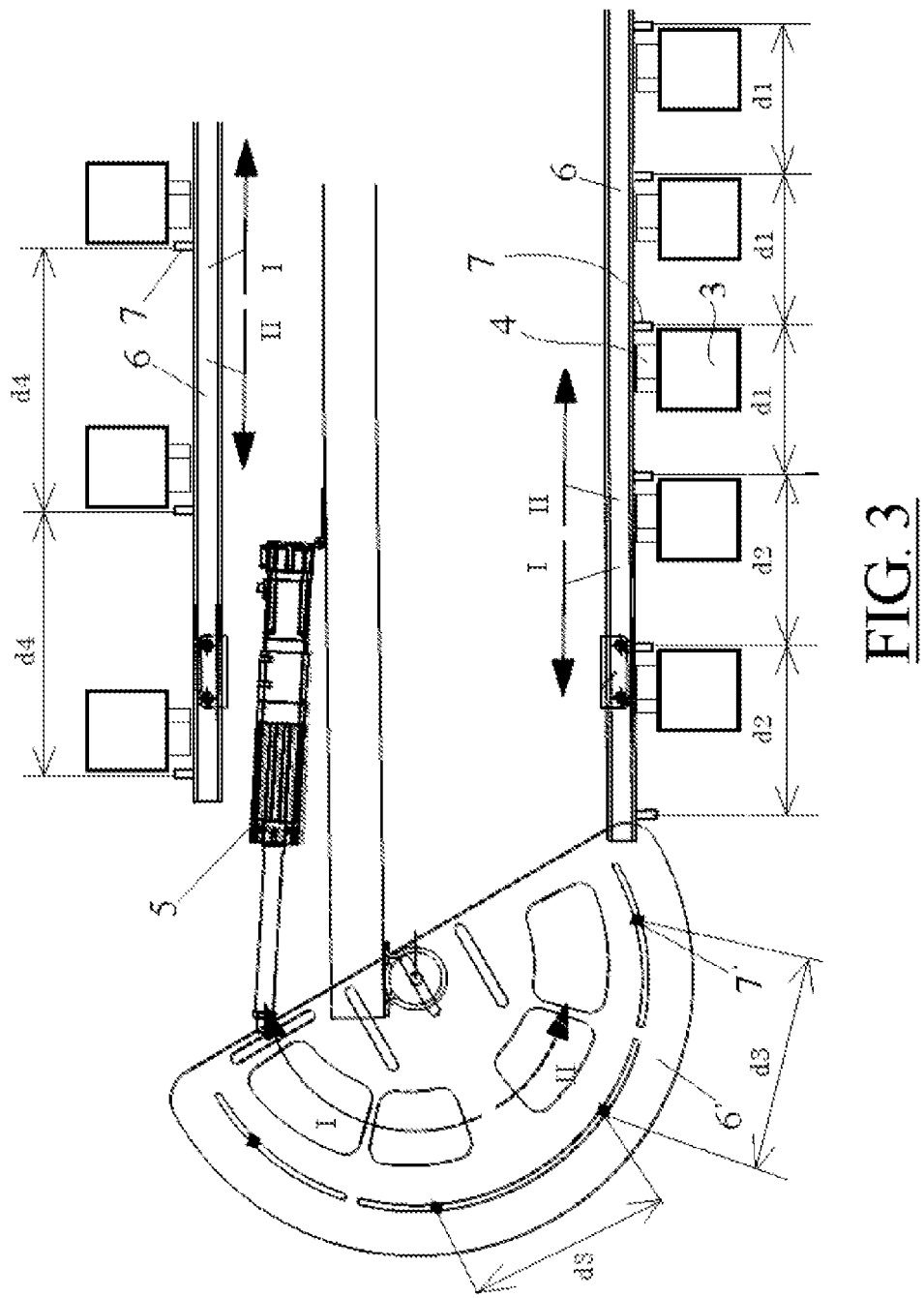
FIG. 3 shows the cooperation between two translational displacement members with a rotating displacement member.

FIG. 3 shows the cooperation of two translational displacement members 6, provided with fixed engagement elements 7, and a rotating displacement member 6', provided with fixed engagement elements 7'. The rotating displacement member 6' results in the units 3 being passed along the "reversing piece" 2' of guide rail 2 at the end of the growing space (for example growing container), driven by a cylinder 5, in the same way in which the units 3 are also passed along the straight portions of the guide rail 2 by means of the straight displacement members 6.

The various FIGS. 1-3 show that the second engagement elements 7 are arranged across the entire operating area of the displacement members 6 and 6', respectively, in such a way that, in the direction in which the units 3 are displaced along the guide rail (in the direction of the arrows I), the mutual distance on average increases, continuously or discontinuously, from d1 to d2 to d3 to d4, etc.

Finally, the following is mentioned with regard to the described exemplary embodiment for the sake of completeness.

The units 3 are preferably displaced along the guide rails 2 and 2' (the "monorail") by sets of wheels preferably comprising three wheels 3' in order to provide stability on straight sections, but to also have the ability of taking a tight bend (the guide rail 2'). The sets of wheels are configured to be able to rest on top of the guide rails and to move around the irrigation and still allow water to enter into the units 3 and water the plants situated therein.

The vertical units 3 (the "towers") comprise plug holders 3" on their side faces which are configured to be able to receive preferably slightly upwardly directed substrate plugs containing plants.

In the bend 2' of the monorail, the units 3 make a greater sweep (d3) than on the straight sections of the monorail 2 in order to prevent the plants from being crushed in the inside bend.

In this way, the present invention provides a system, comprising a guide rail from which (growing) units are suspended in juxtaposition and are thus guided and displaced through a growing space, for example a growing container, during growth of the plants, with the mutual distance between the hanging growing units being automatically increased during the process in order to provide increasingly more space to the plants as the growing process progresses.

The invention claimed is:

1. A device for driving a number of vertical elongate units which are suspended from a guide rail so as to be displaceable, in particular, growing units which are configured for growing plants, wherein each unit comprises a first engagement element;
   wherein the device furthermore comprises one or more drive means which alternately perform a first, outward movement (I) and a second, inward movement, in particular, the device comprises one or more drive cylinders, which one or more drive means are connected to one or more cooperating displacement members, each of which comprises a row of second engagement elements,
   wherein the first engagement elements and the second engagement elements are configured such that they, on the one hand, engage with each other in such a way when the drive means perform the first movement that the units whose first engagement element is situated in the vicinity, within the effective range of the movement, of one of the second engagement elements, is displaced along the guide rail by this second engagement element of the respective displacement member, while these first and second engagement elements, on the other hand, when the drive means perform the second movement, either do not engage with each other or engage with each other in such a way that the units whose first engagement element is situated in the vicinity, within the effective range of the movement, of one of the second engagement elements, is not displaced along the guide rail by that second engagement element of the respective displacement member.

2. The device as claimed in claim 1, wherein a mutual distance between the second engagement elements, calculated across the entire operating area of the one or more cooperating displacement members, differs.

3. The device as claimed in claim 1, wherein the second engagement elements are provided across the entire operating area of the one or more displacement members in such a way that, in the direction in which the units are displaced along the guide rail, a mutual distance, on average, increases continuously or discontinuously.

4. The device as claim 1, wherein the first engagement elements comprises a pawl which is rotatable or otherwise movable and which is configured in such a way that the respective unit is only displaced during the first movement.

5. The device as claimed in claim 1, wherein the second engagement elements comprise a pawl which is rotatable or otherwise movable and which is configured in such a way that the respective unit is only displaced during the first movement.

\* \* \* \* \*